United States Patent
Srivastava et al.

(10) Patent No.: US 10,435,500 B2
(45) Date of Patent: Oct. 8, 2019

(54) POLYURETHANE BASED GEL COMPOSITION

(71) Applicant: Dow Global Technologies LLC, Midland, MI (US)

(72) Inventors: Yasmin N. Srivastava, Sugar Land, TX (US); Rogelio Gamboa, Brazoria, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/327,149

(22) PCT Filed: Sep. 2, 2015

(86) PCT No.: PCT/US2015/048020
§ 371 (c)(1),
(2) Date: Jan. 18, 2017

(87) PCT Pub. No.: WO2016/036786
PCT Pub. Date: Mar. 10, 2016

(65) Prior Publication Data
US 2017/0166681 A1      Jun. 15, 2017

Related U.S. Application Data

(60) Provisional application No. 62/045,758, filed on Sep. 4, 2014.

(51) Int. Cl.
| | | |
|---|---|---|
| C08G 18/50 | (2006.01) | |
| C08G 18/08 | (2006.01) | |
| C08G 18/22 | (2006.01) | |
| C08G 18/76 | (2006.01) | |
| C08G 18/48 | (2006.01) | |
| C08G 18/28 | (2006.01) | |
| C08G 18/10 | (2006.01) | |
| C08G 18/12 | (2006.01) | |
| C08G 18/66 | (2006.01) | |

(52) U.S. Cl.
CPC ......... *C08G 18/5021* (2013.01); *C08G 18/08* (2013.01); *C08G 18/10* (2013.01); *C08G 18/12* (2013.01); *C08G 18/22* (2013.01); *C08G 18/222* (2013.01); *C08G 18/227* (2013.01); *C08G 18/283* (2013.01); *C08G 18/48* (2013.01); *C08G 18/482* (2013.01); *C08G 18/485* (2013.01); *C08G 18/4812* (2013.01); *C08G 18/4837* (2013.01); *C08G 18/5045* (2013.01); *C08G 18/76* (2013.01); *C08G 18/7671* (2013.01); *C08G 2220/00* (2013.01)

(58) Field of Classification Search
CPC .... C08G 18/5045; C08G 18/48; C08G 18/10; C08G 18/08; C08G 18/22; C08G 18/76; C08G 18/7671; C08G 18/5021; C08G 18/4812; C08G 18/283; C08G 18/482; C08G 18/222; C08G 18/227; C08G 18/485; C08G 18/4837; C08G 18/12; C08G 2220/00
See application file for complete search history.

(56) References Cited

U.S. PATENT DOCUMENTS

| | | |
|---|---|---|
| 2005/0223493 A1 | 10/2005 | Setokawa et al. |
| 2007/0066788 A1 | 3/2007 | Hoffmann et al. |
| 2007/0078253 A1* | 4/2007 | Ulbrich ............... B29C 37/0032 528/44 |
| 2012/0167308 A1 | 7/2012 | Van Lear |
| 2012/0180225 A1* | 7/2012 | Gladney ............... A47C 27/148 5/740 |
| 2013/0000045 A1 | 1/2013 | Losio et al. |
| 2013/0146211 A1 | 6/2013 | Mason et al. |

FOREIGN PATENT DOCUMENTS

| | | |
|---|---|---|
| WO | 2004074343 A1 | 9/2004 |
| WO | 2011112829 A1 | 9/2011 |
| WO | 2013076661 A1 | 5/2013 |

OTHER PUBLICATIONS

International Preliminary Report on Patentability for PCT/US2015/048020, dated Mar. 7, 2017, pp. 1-7.
International Search Report and Written Opinion for PCT/US2015/048020, dated Nov. 20, 2015, pp. 1-9.

* cited by examiner

*Primary Examiner* — Rabon A Sergent

(57) ABSTRACT

A polyurethane gel for comfort applications includes a reaction product of a composition that includes (1) from 5 wt % to 35 wt % of a prepolymer component, based on a total weight of the composition, the prepolymer component including a reaction product of an isocyanate component that includes diphenylmethane diisocyanate (MDI) and a polyol component that includes a polyoxyethylene-polyoxypropylene polyol that has an polyoxyethylene content greater than 65 wt %, based on a total weight of the polyoxyethylene polyoxypropylene polyol, and (2) a remainder of a prepolymer-reactive component that includes an amine-terminated polyol and a propylene oxide-ethylene oxide based monol or polyol. The composition excludes any plasticizers.

9 Claims, No Drawings

POLYURETHANE BASED GEL COMPOSITION

FIELD

Embodiments relate to a polyurethane based gel composition, e.g., for use within comfort applications (such as pillows and mattresses), for use as a cooling layer in comfort applications, for use as a cooling gel forming composition that is sprayable for comfort applications (e.g., for use as an embedded polyurethane gel in materials such as viscoelastic foam).

INTRODUCTION

Polyurethane foams in pillows and mattresses have a tendency to store heat, which has the disadvantage of the user feeling an uncomfortable rise in temperature during use. Gels based on traditional polyurethane gel technology, which may be characterized by the presence of a solid elastomeric matrix combined with a plasticizer (liquid non-reactive component), has been proposed for use with polyurethane foams counterbalance the rise in temperature observed by the user. However, the plasticizer is not bonded to the polymeric matrix and it may migrate. The migration of the plasticizer may cause various negative effects such as leakage of plasticizer, progressive loss of elasticity, and/or increase in brittleness of the traditional polyurethane gel. Accordingly, alternative gels that minimize and/or avoid the use of the plasticizers are sought.

SUMMARY

Embodiments may be realized by providing a polyurethane gel for comfort applications that includes a reaction product of a composition that includes (1) from 5 wt % to 35 wt % of a prepolymer component, based on a total weight of the composition, the prepolymer component including a reaction product of an isocyanate component that includes diphenylemethane diisocyanate (MDI) and a polyol component that includes a polyoxyethylene-polyoxypropylene polyol that has an polyoxyethylene content greater than 65 wt %, based on a total weight of the polyoxyethylene polyoxypropylene polyol, and (2) a remainder of a prepolymer-reactive component that includes an amine-terminated polyol and a propylene oxide-ethylene oxide based monol or polyol. The composition excludes any plasticizers.

Embodiments may also be realized by providing the polyurethane gel as a gel layer and/or an embedded gel layer in a mattress, pillow, and/or viscoelastic foam.

DETAILED DESCRIPTION

Embodiments relate to a polyurethane based gel that excludes any plasticizers for use in comfort applications. By plasticizer it is meant an additive added to increase the plasticity or fluidity of a material. For this application, a plasticizer is defined as different from polyol components in a polyurethane formulation and catalytic/curative components in a polyurethane formulation. For example, polyol components are typically regarded as reactive components in polyurethane formulations, while a plasticizer may be embedded within matrices formed by reactive components in polyurethane formulations. By polyurethane gel used in comfort applications, it is meant a gel that utilizes polyurethane reactive chemistry for use as surface toppers or coatings to improve thermal comfort in comfort applications such as pillows and mattresses. With respect to the embodiments, the gel is defined as having a Shore hardness 00 that is 30 or less (e.g., from 5 to 30, from 23 to 30, etc.). Improved thermal comfort is defined as exhibiting a specific heat that is greater than 1.5 J/g*° C. (e.g., from 1.6 to 3.0 J/g*° C., from 1.8 to 2.5 J/g*° C., from 1.8 to 2.2 J/g*° C., etc.) and a thermal conductivity that is greater than 0.120 Watt/m*° K (e.g., from 0.130 to 0.200, from 0.135 to 0.180, from 0.140 to 0.160, etc.)

The polyurethane gel is a reaction product of a composition that includes a prepolymer component that has an diphenylemethane diisocyanate (MDI) based prepolymer and a prepolymer-reactive component that has an amine-terminated polyol (e.g., a diamine derived polyol such as an ethylenediamine based polyol). The prepolymer component accounts for 5 wt % to 35 wt % (e.g., 7 wt % to 30 wt %, 8 wt % to 25 wt %, etc.), of the total weight of the composition for forming the polyurethane gel. The remainder of the composition for forming the polyurethane gel is the prepolymer-reactive component. The prepolymer-reactive component may include, in addition to the amine-terminated polyol, at least one additional polyol, at least one catalyst, and/or at least one other additive, besides a plasticizer, that is known in the art for use in polyurethane gels. The amine-terminated polyol accounts for 0.5 wt % to 10 wt % (e.g., 0.5 wt % to 5.0 wt %, 1.0 wt % to 3.0 wt %, 1.0 wt % to 2.0 wt %, etc.) based on the total weight of the composition for forming polyurethane gel. The at least one additional polyol may account for 6.0 wt % to 94.5 wt % (e.g., 50.0 wt % to 94.0 wt %, 60.0 wt % to 94.0 wt %, 80.0 wt % to 94.0 wt %, 85.0 wt % to 92.0 wt %, etc.) As is known in the art, the isocyanate index for forming the polyurethane gel may be less than 100, whereas isocyanate index is the ratio of isocyanate reactive groups in the prepolymer to the isocyanate-reactive groups in the prepolymer-reactive component, multiplied by 100.

Prepolymer Component

The prepolymer component includes at least one isocyanate-terminated prepolymer that is a reaction product of an isocyanate component (that includes at least one isocyanate) and a polyol component (that includes at least one polyol). The prepolymer component includes at least one isocyanate-terminated prepolymer having an NCO content from 2 wt % to 20 wt % (e.g., 5 wt % to 10 wt %, 6 wt % to 8 wt %, etc.). According to embodiments, the isocyanate component includes MDI and the polyol component includes at least a polyoxyethylene-polyoxypropylene polyol that has a polyoxyethylene content greater than 65 wt % (based on a total weight of the polyoxyethylene-polyoxypropylene polyol), based on a total weight of the polyoxyethylene-polyoxypropylene polyol. A remainder of the weight content of the polyoxyethylene-polyoxypropylene polyol based on a total of 100 wt % is accounted for with polyoxypropylene, e.g., the polyoxypropylene content is at least 5 wt %.

The MDI based prepolymer (e.g., an isocyanate-terminated MDI based prepolymer) may be prepared using polymeric MDI and/or mixtures of different isomers of MDI, e.g., using 4,4'-diphenylemethane diisocyanate (4,4' isomer of MDI) and/or 2,4'-diphenylemethane diisocyanate (2,4' isomer of MDI). The free isocyanate group content (i.e., NCO content) of the MDI based prepolymer may be from 1 wt % to 25 wt %, based on a total weight of the prepolymer. The 2,4'- and 4,4'-diphenylemethane diisocyanate isomers of MDI may be present in the isocyanate component in a weight ratio from 0:100 to 50:50. For example, the 2,4' isomer of MDI may be present in an amount from 5 wt % to 50 wt % (e.g., 10 wt % to 50 wt %, 15 wt % to 35 wt %, 20 wt % to 30 wt %, etc.), based on a total weight of the isocyanate component. A weight percentage of the 4,4' isomer of MDI may be greater than a weight percentage of the 2,4' isomer of MDI, based on a total weight of the isocyanate component. For example, a formulation for forming the MDI based prepolymer has a 2,4' isomer of MDI content from 1.5 wt % to 40 wt % (e.g., 1.5 wt % to 30 wt %) and a remainder of the 4,4' isomer of MDI, based on a total weight of 100 wt % of the formulation for forming the prepolymer component. According to exemplary embodiments, a balance of the isocyanate component that is not accounted for with the 4,4' isomer of MDI and/or the 2,4' isomer of MDI may include toluene diisocyanate, hexamethylene diisocyanate, isophorone diisocyanate, polymethylene polyphenylisocyanate, carbodiimide or allophanate or uretonimine adducts of methylene diphenylisocyanate, and mixtures thereof.

The free NCO content of the MDI based prepolymer may be from less than 15 wt %, less than 10 wt %, and/or less than 8 wt % (e.g., from 5 wt % to 15 wt %, 5 wt % to 13 wt %, 6 wt % to 11 wt %, 6 wt % to 8 wt %, 6.5 wt % to 7.5 wt %, etc.). Polyisocyanate may be back blended into the MDI based prepolymer to reach the desired free NCO content. The MDI based prepolymer may be the reaction product of the isocyanate component and the polyol component. In which case, prepolymer component consists essentially of the MDI based prepolymer.

The polyol component includes at least one polyether polyol having an average nominal hydroxyl functionality from 1.6 to 8 (e.g., 1.6 to 3.5) and a number average molecular weight from 1000 to 12,000 (e.g., 1,000 to 8,000, 1,200 to 6,000, 2,000 to 5,500, etc.). In particular, the polyol component includes at least one polyoxyethylene-polyoxypropylene polyol. Combinations of other polyether polyols, including monohydroxyl substances and low molecular weight diol and triol substances or amines, of varying functionality and polyoxyethylene content may be used in the formulation for preparing the prepolymer component.

According to embodiments, the polyol component includes at least one polyoxyethylene-polyoxypropylene polyol that has a polyoxytheylene content greater than 65 wt %, greater than 70 wt %, and/or at least 75 wt %, based on a total weight of the polyoxyethylene-polyoxypropylene polyol. A remainder of the weight content of the polyoxyethylene-polyoxypropylene polyol based on a total of 100 wt % is accounted for with polyoxypropylene. For example, the polyoxyethylene-polyoxypropylene polyol may have a polyoxypropylene content of at least 5 wt % (e.g., at least 10 wt %, at least 15 wt %, and/or at least 20 wt %) and a polyoxytheylene content greater than 65 wt %, based on a total weight of the polyoxyethylene-polyoxypropylene polyol. The polyoxyethylene-polyoxypropylene polyol may account for from 5 wt % to 100 wt % (e.g., 9 wt % to 100 wt %, 95 wt % to 100 wt %, etc.) of the polyol component. The polyoxyethylene-polyoxypropylene polyol may have an average nominal hydroxyl functionality from 1.6 to 3.5 (e.g., 2.5 to 3.5) and a number average molecular weight from 1,500 to 8,000 (e.g., 2,000 to 6,000, 3,000 to 5,500, 4,000 to 5,300, etc.). The polyoxyethylene content of the individual polyols may be randomly distributed throughout the molecule. According to an exemplary embodiment, the polyol component includes only the polyoxyethylene-polyoxypropylene polyol, and thus the polyol component has a polyoxytheylene content greater than 65 wt %, greater than 75 wt %, and/or at least 75 wt %, based on a total weight of the polyol component.

The at least one isocyanate of the isocyanate component and the at least one polyol of the polyol component used may independently be commercially available and/or may be produced using processes known to those skilled in the art. For example, the polyether polyol may be obtained by reacting ethylene oxide and/or propylene oxide simultaneously and/or sequentially in any order with at least one initiator having 2 to 8 active hydrogen atoms. Exemplary initiators include water, ethylene glycol, propylene glycol, butanediol, glycerol, trimethyol propane, ethylene diamine, triethanolamine, sucrose, and sorbitol.

Additives (such as additives known in the art for use in forming prepolymers and polyurethanes) may be used in the preparation of the prepolymer component. For example, the composition for forming the prepolymer component may include at least one catalyst, at least one crosslinker, and/or at least one chain extender. The composition for forming the prepolymer component excludes any plasticizers.

The prepolymer component, e.g., the MDI based prepolymer, may be prepared by combining the isocyanate component and the polyol component at 20-100° C. If desired, the prepolymer component may be prepared in the presence of urethane-forming catalyst, such as a tertiary amine or tin compound.

Prepolymer-Reactive Component

The prepolymer-reactive component is a blend that includes at least an amine-terminated polyol (e.g., a diamine derived polyol such as an ethylenediamine based polyol) and a propylene oxide-ethylene oxide based monol or polyol.

The amine-terminated polyol may have a number average molecular weight that is less than 325 g/mole (e.g., with respect to the amine-terminated polyol, such as the diamine derived polyol (e.g., from 50 g/mole to 320 g/mol, from 100 g/mole to 300 g/mole, from 200 g/mole to 300 g/mole, from 250 g/mole to 300 g/mole, etc.). For example, the amine-terminated polyol is an ethylenediamine based polyol that is be formed by reacting propylene oxide, ethylene oxide, and/or butylene oxide with a diamine (e.g., ethylenediamine). For example, embodiments may include an ethylenediamine based polyol that is propoxylated/ethoxylated ethylenediamine polymer formed by reacting ethylenediamine with propylene oxide and ethylene oxide. The ethylenediamine may act as an initiator in the formation of the resulting polyether polyol. For example, the following reaction scheme may be used to form an ethylenediamine based polyol that is also an amine-terminated polyol:

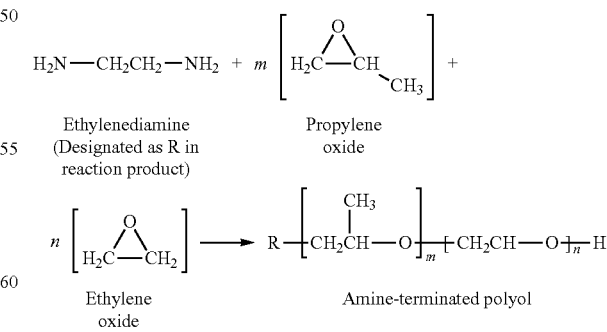

Ethylenediamine (Designated as R in reaction product)

Propylene oxide

Ethylene oxide

Amine-terminated polyol

In addition to the amine-terminated polyol, the prepolymer-reactive component includes a propylene oxide-ethylene oxide based monol or polyol. The propylene oxide-ethylene oxide based monol or polyol may have an ethylene oxide content that is greater than 50 wt %, based on the total weight of the propylene oxide-ethylene oxide based monol or polyol.

The polyol may be a polyoxypropylene-polyoxyethylene polyether polyol having an average nominal hydroxyl functionality from 1.6 to 8 (e.g., 1.6 to 3.5) and a number average molecular weight from 1000 to 12,000 (e.g., 1,000 to 8,000, 1,200 to 6,000, 2,000 to 5,500, etc.). For example, the polyether polyol may be a diol or a triol.

The monol may be a hydroxyl terminated monol that includes oxyethylene and oxypropylene groups and has the following structure:

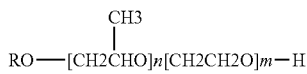

Optionally, at least one catalyst may be premixed with the prepolymer-reactive component (and/or the prepolymer component). The catalyst may be added in an amount to modify the curing time of the reaction product and facilitate in attaining the desired physical attributes of the gel. Suitable catalysts include, e.g., substances known in the art for promoting the reaction of an isocyanate with a polyol. For example, the catalyst may include a sodium bicarbonate, a tertiary amine, and/or an organometallic compound. Exemplary catalysts include n-methyl morpholine, n-ethyl morpholine, trimethylamine, triethylamine, tetramethyl butane diamine, triethylenediamine, dimethylaminoethanolamine, benzylidimethylamine, dibutyl tin dilaurate, and stannous octoate. Other optional additives (that are not plasticizers) such as fillers, fibers, textiles, fatty oils, crosslinkers, and/or functional additives, may be present (e.g., in the prepolymer-reactive component) when modified physical properties are sought. The fillers may include natural and/or synthetic materials. Exemplary fillers include wood based materials, cork based materials, silicate based materials, glass based materials, and mineral based materials. Other additives present may be fragrances, perfumes, and/or other substances that may be detected by scent.

An exemplary method for forming a final polyurethane gel product includes bringing the prepolymer-reactive component to a temperature from 5° C. to 50° C. and introducing the prepolymer component to form a mixture. The mixture is then brought to a reaction area, e.g., a mold or a pour area, dispensed, and then allowed to react.

According to an exemplary embodiment, the polyurethane gel is sprayable for comfort application, e.g., so as to form a cooling gel forming composition for use as an embedded polyurethane gel in materials such as viscoelastic polyurethane foams (such as viscoelastic foam based mattresses and pillows) and/or use as a polyurethane gel layer on a surface of materials such as viscoelastic polyurethane gels. The polyurethane gel may be formed by first spraying the prepolymer-reactive component onto the material (e.g., a piece of viscoelastic polyurethane foam). Then, the prepolymer component may be sprayed separately onto the material, i.e., to have a two-step application process in which the prepolymer-reactive component is sprayed before the prepolymer component. Thereafter, the prepolymer-reactive and prepolymer components are allowed to react with each other to form the polyurethane gel layer that is embedded into the material and/or on the material. In other exemplary embodiments, both the prepolymer and the prepolymer-reactive component may be pre-mixed before spraying onto the material, may be concurrently sprayed onto the material, or the prepolymer component may be sprayed before the prepolymer-reactive component.

The sprayable process for forming the polyurethane gel may be made without using high pressure impingement or low pressure mixing technology. The sprayable process for forming the polyurethane gel may utilize a vacuum assisted process to infuse the gel inside the matrix of a viscoelastic polyurethane foam.

By way of summation and review, there is a need for an alternative non-plasticizer based polyurethane gel system and for higher cooling efficiency in comfort/coolant market (such as pillows, mattresses, saddles, sportswear, and appliances/electronics). Accordingly, addressing this growing need, the embodiments relate to a non-plasticizer based polyurethane gel that combines higher thermal comfort and good physical-mechanical properties. All parts and percentages herein are by weight, unless otherwise indicated. All descriptions of molecular weight are based on a number average molecular weight, unless otherwise indicated.

EXAMPLES

The following materials are principally used:

MDI Prepolymer A diphenylemethane diisocyanate (MDI) based prepolymer having a target average isocyanate moiety (NCO) content of 7 wt % prepared according to the formulation in Table 1, below:

TABLE 1

|  | Prepolymer Formulation 1 (wt %) |
| --- | --- |
| ISONATE ™ 125M | 17 |
| ISONATE ™ 50 O,P | 11 |
| UCON ™ PCL-270 | 65 |
| VORANOL ™ CP-1421 | 7 |
| Benzoyl Chloride | <0.01 |

ISONATE™ 125M A MDI based mixture including on average 98 wt % 4,4'-diphenylmethane diisocyanate and 2 wt % of 2,4'-diphenylmethane diisocyanate and having an average NCO content of 33.5 wt % (available from The Dow Chemical Company).

ISONATE™ 50 O,P A MDI based mixture including on average 50 wt % 4,4'-diphenylmethane diisocyanate and 50 wt % of 2,4'-diphenylmethane diisocyanate and having an average NCO content of 33.5 wt % (available from The Dow Chemical Company).

UCON™ PCL-270 A lubricant polyol of a polyalkylene glycol monobutyl ether, having an average nominal hydroxyl functionality of 2 and a number average molecular weight of approximately 2,400 g/mole (available from The Dow Chemical Company).

VORANOL™ CP-1421 A polyoxyethylene/polyoxypropylene polyol initiated with glycerol, having an average nominal hydroxyl functionality of 3, an average hydroxyl number of 33 KOH/g, an average polyoxyethylene content of 75 wt %, and a number average molecular weight of approximately 5,000 g/mole (available from The Dow Chemical Company).

Benzoyl Chloride A 99 wt % solution of benzoyl chloride (available from Sigma-Aldrich).

Comparative A composition that includes a minor component that is a plasticizer and a major component (greater than 80 wt % based on the total weight of the composition) that is a diphenylemethane diisocyanate (MDI) based prepolymer, which is prepared using polypropylene glycol and diphenylmethane diisocyanate. The plasticizer is acetyl tributyl citrate.

Polyol 1 An ethylene-oxide rich polyoxypropylene-polyoxyethylene polyol, having an ethylene oxide content that is greater than 50 wt % based on the total weight of the polyol and an average hydroxyl number of approximately 31 mg KOH/g (available from the Dow Chemical Company as VORANOL™ 4053).

Polyol 2 An propoxylated-ethoxylated ethylenediamine polyol that is also referred to a polyol having autocatalytic activity, having an ethylene oxide content that is greater than 50 wt % based on the total weight of the polyol, an average nominal functionality of four, an average hydroxyl number of approximately 800, and a number average molecular weight of 278 g/mole (available from the Dow Chemical Company as VORANOL™ 800).

Monol A lubricant base stock that is includes oxyethylene and oxypropylene groups with a single terminal hydroxyl group so as to have the following structure:

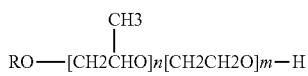

(available from The Dow Chemical Company as SYNALOX™ 25-220B).

Catalyst A catalyst that includes a blend of bismuth carboxylate and zinc carboxylate (available from The Shepherd Chemical Company as BiCAT® 8).

Comparative A composition that includes the reaction product of (1) a minor component that is a plasticizer that includes acetyl tributyl citrate; and (2) a major component (greater than 80 wt % based on the total weight of the composition) that is a diphenylemethane diisocyanate (MDI) based prepolymer, which is prepared using polypropylene glycol and diphenylmethane diisocyanate, and a polyether polyol.

MDI Prepolymer 1 Formation

MDI Prepolymer 1 with a target average NCO content of 7 wt % is prepared according to Table 1, above. The NCO content is measured according to ASTM D5155.

With respect to the Prepolymer Formulation 1, the required amount of UCON™ PCL-270 and VORANOL™ CP-1421, according to Table 1, above, are added to a reactor to form a first mixture that is heated to 100° C. with continuous stirring and nitrogen purging overnight. Then, after the water content is measured to make sure it is less than 250 ppm, Benzoyl Chloride is added to the first mixture to form a second mixture. Thereafter, the second mixture is stirred for 15 min. Also, ISONATE™ 125M and ISONATE™ 50 O,P are added to a four neck flask to form a third mixture, which is heated to 50° C. Next, the second mixture is added to the third mixture, and the resultant mixture is heated to 75° C. and maintained at that temperature for three hours. Thereafter, the temperature of the resultant mixture is lowered down to 60-65° C. and the prepolymer is dispensed into a glass bottle.

Preparation of Gel Examples

Working Examples 1, 2, 3, 4, 5, and 6 are prepared according to the approximate formulations in Table 2, below.

TABLE 2

| | Ex. 1 (wt %) | Ex. 2 (wt %) | Ex. 3 (wt %) | Ex. 4 (wt %) | Ex. 5 (wt %) | Ex. 6 (wt %) |
| --- | --- | --- | --- | --- | --- | --- |
| Prepolymer Component | | | | | | |
| MDI Prepolymer | 9.2 | 9.1 | 9.1 | 23.0 | 23.0 | 23.0 |
| Prepolymer-Reactive Component | | | | | | |
| Polyol 1 | 89.4 | 88.5 | 88.5 | — | — | — |
| Polyol 2 | 1.2 | 1.2 | 1.2 | 1.8 | 1.8 | 1.8 |
| Monol | — | — | — | 75.0 | — | — |
| UCON ™ PCL-270 | — | — | — | — | 75.0 | — |
| VORANOL ™ CP-1421 | — | — | — | — | — | 75.0 |
| Catalyst | 0.2 | 0.2 | 0.2 | 0.2 | 0.2 | 0.2 |
| $TiO_2$ | — | 1.0 | — | — | — | — |
| ZnO | — | — | 1.0 | — | — | — |

Working Examples 2 and 3 include additives that are related to ultraviolet light stability. Accordingly, the polyurethane gels according to embodiments are usable with additives. Comparative Example A is prepared using the Comparative composition discussed above.

The above formulations of Working Examples 1-6 and Comparative Example A are used to prepare polyurethane gels. In particular, gel casting and conditioning are performed by mixing the components of the Prepolymer-Reactive Component using a lab scale speedmixer for 45 seconds at 2300 rpm. The Prepolymer Component is then added to the Prepolymer-Reactive Component and mixed using the lab scale speedmixer for 45 seconds at 2300 rpm. Then, the resultant reaction mixtures are poured into respective open molds lined with polyethylene or thermoplastic polyurethane sheets. The resultant gels are encapsulated with the respective polyethylene or thermoplastic polyurethane sheets after curing. The resultant gels are allowed to condition for at least twenty four hours prior to evaluation of properties.

Evaluation of Examples

Working Examples 1, 2, 3, 4, 5, and 6 and Comparative Example A are evaluated for Shore hardness 00 (used to measure properties of gels), specific heat (the amount of heat in Joules per gram of the material required to raise the temperature of the material by one degree Celsius), and thermal conductivity (the quantity of heat transmitted in BTUs per foot and hour through a thickness in a direction normal to a surface of unit are, due to a unit temperature gradient under steady state conditions (e.g., Btu*in/hour*ft$^2$*° F. or Watt/(m*° K)). The conversion from [Btu*in/hour*ft$^2$*° F.] to [Watt/(m*° K)] would be understood by a person of ordinary skill in the art (e.g., as a multiplication factor of approximately 0.144). Working Examples 1, 4, 5, and 6 and Comparative Example A are further evaluated for Compression Force Deflection (CFD) at 25% as measured in kPa. The term "Compression Force Deflection" refers to a measure of the load bearing capacity of a flexible material measured as the force required to compress a sample to 25 percent of the sample's initial height. ASTM D3574 Test C equivalent to ISO 3386-1 is used to both measure the CFD@25% and Percent Hysteresis This evaluation is outlined in Table 3, below:

TABLE 3

| | Shore Hardness 00 | Specific Heat (J/g * ° C. | Thermal Conductivity (Btu * in/ hr * ft² * ° F.) | Thermal Conductivity Watt/(m * ° K) | CFD @ 25% (kPa) | Percent Hysteresis (%) |
|---|---|---|---|---|---|---|
| Ex. 1 | 26 | 2.1 | 1.0 | 0.144 | 13.5 | 22.6 |
| Ex. 2 | 26 | 2.0 | 1.0 | 0.144 | N/D | N/D |
| Ex. 3 | 26 | 1.9 | 1.0 | 0.144 | N/D | N/D |
| Ex. 4 | 25 | 1.9 | 1.0 | 0.144 | 13.9 | 9.9 |
| Ex. 5 | 27 | 1.9 | 1.0 | 0.144 | 8.4 | 23.0 |
| Ex. 6 | 29 | 1.9 | 1.0 | 0.144 | 24.4 | 10.3 |
| Ex. A | 22 | 1.2 | 0.8 | 0.110 | 1.7 | 11.0 |

*N/D: Not determined

Shore Hardness 00 is measured Shore Hardness according to ASTM D 2240, Sh00 scale. Measurements are performed on specimens of samples having a minimum thickness of 0.4 inch (10 mm).

Specific heat measurements are performed using a DSC Q2000 Series-0205, available from TA Instruments. Both sapphire and sample runs are performed in Isothermal mode for 10.00 min (modulated DSC mode). Once samples are analyzed, the corrected factor for the sapphire is multiplied by the value of each gel sample to provide a heat capacity measurement. As would be understood by a person of ordinary skill in the art, KCp=Cp of sapphire known /Cp of sapphire is observed. The known sapphire at 25° C. is 0.7729 J/(g).

Thermal conductivity measurements are performed using a Laser Comp Heat Flow Meter, on the basis of Fourier's Law, otherwise known as the Law of Heat Conduction. Measurements are made by placing a gel sample between two flat, isothermal plates, which are maintained at two different temperatures (dT). Typically, one plate is referred to as the "hot plate", and the other plate is referred to as the "cold plate". Heat flux measurements are carried at a mean test temperature of 75° F. and 40° F. test temperature differentials. The Laser Comp Heat Flow meters measure heat flow in only one direction, so Fourier's Law can be simply stated as the following:

$$q = -\lambda(dT/dx) \text{ or } \lambda = -q(dx/dT)$$

where: q=heat flux (W/m2 or BTU/ft2); λ=thermal conductivity (W/m-K or BTU/hr-ft-F); and dT/dx=temperature gradient in the x direction (K/m or F/ft).

Preparation of Embedded Foam Sample

Working Example 1 is also evaluated for airflow (in cubic feet per minute) and surface temperature (in degrees F.), when sprayed onto a viscoelastic polyurethane foam sample. When the polyurethane gel of Working Example 1 is applied to the viscoelastic polyurethane foam sample, a less than 1 ft³/min drop in air flow may be realized (showing that the gel does not have a significant adverse effect on the overall airflow of the viscoelastic polyurethane foam sample) and a decrease in surface temperature may be realized (showing a lower "hot" feeling associated with the viscoelastic polyurethane foam sample) as compared to a control prepared using the viscoelastic polyurethane foam sample alone.

Working Example 1 is found to have an airflow of approximately 3.485 ft³/min and a surface temperature of approximately 70° F. The control is found to have an airflow of approximately 4.238 ft³/min and a surface temperature of approximately 71° F. Air flow is measured based on ASTM D3574, Test G by placing 2×2×1 inch cut samples snugly into a vacuum chamber and measuring the airflow. Surface temperature (cooling efficiency) is measured using handheld infrared thermometer from Raytek Raynger.

The invention claimed is:

1. A polyurethane gel for comfort applications, the polyurethane gel comprising:
   a reaction product of a composition that includes:
   from 5 wt % to 35 wt % of a prepolymer component, based on a total weight of the composition, the prepolymer component having an isocyanate content of 6 to 11% by weight and including a reaction product of an isocyanate component that includes diphenylmethane diisocyanate (MDI) in which 2,4'-MDI constitutes 15 to 35 weight percent of the isocyanate component and a polyol component that has a polyoxyethylene content greater than 65 wt % based on the weight of the polyol component and includes a polyoxyethylene-polyoxypropylene polyol that has an polyoxyethylene content greater than 65 wt %, based on a total weight of the polyoxyethylene-polyoxypropylene polyol; and
   a remainder of the composition being a prepolymer-reactive component that includes an amine-initiated polyol having a molecular weight of less than 325 g/mole and a propylene oxide-ethylene oxide based monol or polyol having an oxyethylene content of greater than 50% by weight based on the weight of the propylene oxide-ethylene oxide based monol or polyol, the amine-initiated polyol constituting 0.5 to 5 weight percent of the composition, wherein the composition excludes any plasticizers and the polyurethane gel has a specific heat that is greater than 1.5 J/g*° C. and a thermal conductivity that is greater than 0.120 Watt/m*° K.

2. The polyurethane gel as claimed in claim 1, wherein the amine initiated polyol is an ethylenediamine based polyol.

3. The polyurethane gel as claimed in claim 2, wherein the ethylenediamine based polyol is a propoxylated-ethoxylated ethylenediamine polyol.

4. The polyurethane gel as claimed in claim 3, wherein the propylene oxide-ethylene oxide based monol or polyol accounts for 60 wt % to 94 wt % of the total weight of the composition.

5. A pillow including a gel layer including the polyurethane gel as claimed in claim 4, the gel layer having a Shore hardness 00 that is 30 or less, the specific heat that is greater than 1.5 J/g*° C., and the thermal conductivity that is greater than 0.120 Watt/m*° K.

6. A mattress including a gel layer including the polyurethane gel as claimed in claim 4, the gel layer having a Shore hardness 00 that is 30 or less, a specific heat that is greater than 1.5 J/g*° C., and a thermal conductivity that is greater than 0.120 Watt/m*° K.

7. A viscoelastic foam that includes the polyurethane gel as claimed in claim 4 embedded therein.

8. A pillow including a gel layer consisting essentially of the polyurethane gel as claimed in claim 1, the gel layer having a Shore hardness 00 that is 30 or less, the specific heat that is greater than 1.5 J/g*° C., and the thermal conductivity that is greater than 0.120 Watt/m*° K.

9. A mattress including a gel layer consisting essentially of the polyurethane gel as claimed in claim 1, the gel layer having a Shore hardness 00 that is 30 or less, the specific heat that is greater than 1.5 J/g*° C., and the thermal conductivity that is greater than 0.120 Watt/m*° K.

* * * * *